(No Model.)
W. F. DOLL.
RING GAGE.
No. 517,096. Patented Mar. 27, 1894.
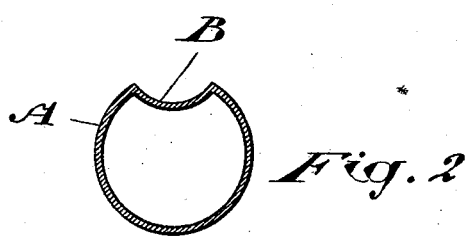
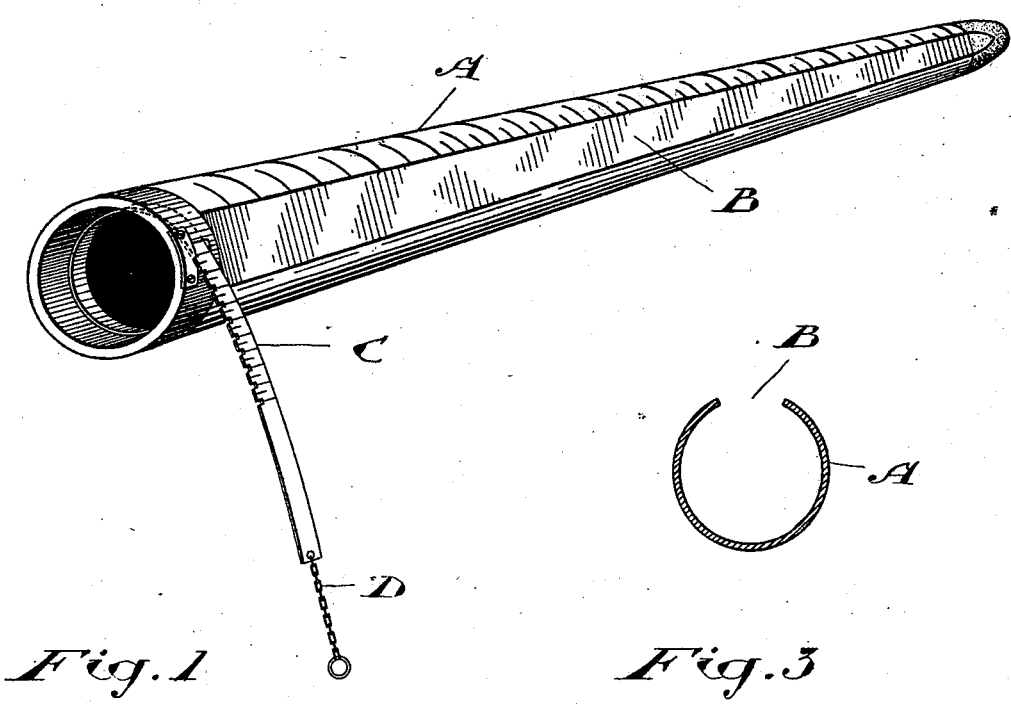
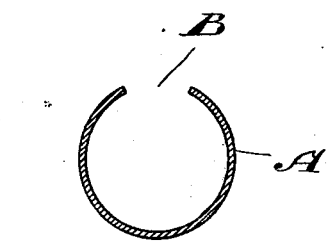
Fig. 1.     Fig. 3.
Witnesses                            Inventor
E. C. Bruch                        W. F. Doll
A. N. Neff                    by Ridout & Maybee
                                            Attys
THE NATIONAL LITHOGRAPHING COMPANY,
WASHINGTON, D. C.

UNITED STATES PATENT OFFICE.

WILLIAM F. DOLL, OF WINNIPEG, CANADA.

RING-GAGE.

SPECIFICATION forming part of Letters Patent No. 517,096, dated March 27, 1894.

Application filed October 4, 1893. Serial No. 487,140. (No model.)

*To all whom it may concern:*

Be it known that I, WILLIAM FREDERICK DOLL, of the city of Winnipeg, in the county of Selkirk, in the Province of Manitoba, Canada, have invented a certain new and Improved Ring-Gage, of which the following is a specification.

My invention relates to certain improvements on a ring gage described and claimed in United States Patent No. 438,453, and has for its object to adapt the ring gage there shown to the measurement of rings as well as fingers, special provision being made to admit of the measurement of rings having stones projecting through the bottom of the setting.

My invention consists, essentially, in extending the hollow drum there shown in the shape of a frustum of a cone, and marking thereon scales in use for measuring rings, a portion of the side of the gage being cut away substantially as hereinafter more particularly explained.

Figure 1, is a perspective view of a ring gage embodying my improvements. Figs. 2 and 3 are transverse sections of alternate forms thereof.

In the drawings, like letters of reference indicate corresponding parts in all the figures.

A, is a hollow drum or case made of metal or other suitable material and preferably shaped like the frustum of a cone. On this drum I mark the usual scales in use for measuring rings. The smaller end of the drum is preferably closed by a wooden plug, but the larger end is left open.

One side of the drum is preferably cut away as indicated in the drawings. It is immaterial what the exact shape of this cut away portion B, is, as it may be made of many different forms as indicated. A portion of the side of the drum may be cut away entirely as indicated in Fig. 3.

C, is a tape-like spring measure which may be made of a piece of watch spring metal or of any flexible material and should be of sufficient length to more than coil around the largest finger measured, and which may have attached to one end a pull chain D. This spring tape measure is riveted or otherwise fastened at one end to the inside of the drum A, while the other end passes out through a slot in the case adjacent to the fast end of the measure. The said spring measure has a scale on its outer side, the graduations of which correspond with the standard of ring sizes in use among dealers and manufacturers of finger rings. It is not necessary to enter into details of this portion of my invention, as it is already described and claimed in the patent before mentioned.

When using my device, a finger is first measured by the tape C, and a ring of a size to correspond with the measurement so taken may be chosen by means of the graduated drum A, the whole arrangement occupying no more space than an ordinary ring gage. The drum A, having a portion of its side cut away, as indicated, forms a most important feature of my invention.

When rings having stones projecting through the bottom of the setting are measured by an ordinary gage, it is not an unusual thing for the stone to be forced out of place or the setting seriously damaged, but with my device, no such trouble is likely to occur as the base of the stone projects into the space left in the side of the drum and the rings may be properly measured without the stone coming into contact with the gage.

What I claim as my invention is—

1. In a ring gage, the drum A, shaped as the frustum of a cone and having ring measuring scales marked thereon, a portion of its side at B, being cut away, substantially as and for the purpose specified.

2. In a ring gage, a hollow drum A, shaped as the frustum of a cone and having ring measuring scales marked thereon, a portion of its side being cut away, in combination with a graduated tape-like measure secured at its one end to the said drum, the other end passing out through a slot in the drum in proximity to the fast end of the measure, substantially as and for the purpose specified.

Toronto, October 30, 1893.

WILLIAM F. DOLL.

In presence of—
EDMUND BRISTOL,
J. EDW. MAYBEE.